United States Patent [19]

Baba et al.

[11] 4,023,203

[45] May 10, 1977

[54] SYSTEM FOR COMPENSATING A PHASE DIFFERENCE BETWEEN MAGNETIC TRACKS IN A MAGNETIC RECORDED INFORMATION REGENERATING APPARATUS

[75] Inventors: Masaru Baba, Sagamihara; Shuhei Inamori, Isehara, both of Japan

[73] Assignee: Fujitsu Ltd., Kanagawa, Japan

[22] Filed: Nov. 26, 1975

[21] Appl. No.: 635,328

[30] Foreign Application Priority Data

Dec. 4, 1974   Japan .................. 49-139821

[52] U.S. Cl. .................. 360/26; 360/47
[51] Int. Cl.² .................. G11B 5/43
[58] Field of Search .................. 360/22, 26, 47

[56] References Cited

UNITED STATES PATENTS

| | | | |
|---|---|---|---|
| 2,813,259 | 11/1957 | Burkhart | 360/47 |
| 3,078,448 | 2/1963 | O'Brien | 360/47 |
| 3,188,614 | 6/1965 | VanBerkel | 360/47 |
| 3,303,482 | 2/1967 | Jenkins | 360/47 |
| 3,320,598 | 5/1967 | Star | 360/47 |
| 3,354,446 | 11/1967 | Avril et al. | 360/47 |

*Primary Examiner*—Vincent P. Canney
*Attorney, Agent, or Firm*—Staas & Halsey

[57] ABSTRACT pg,1 This invention discloses a multi-track recorded information regenerating system which regenerates signals recorded on a plurality of tracks and which composes and demodulates these recorded signals so as to obtain a read output signal. The characteristic feature of the present invention is to provide a delay circuit, which delays the regenerated signals in each track. Three signals are synthesized; that is, a first signal is synthesized from two regenerated signals from two tracks, and a second and a third signal are synthesized from one of the regenerated signals from two tracks and one of the outputs of the delay circuit. These synthesized signals are detected by an error checking circuit to determine whether or not said synthesized signals represent correct information recorded on the magnetic track, and the synthesized signal having the correct information is used as the read output of the multi-track recording system.

16 Claims, 12 Drawing Figures

DATA FORMAT

DATA : FIVE UNIT CODE

DM : 00000

ST : 11010 (START CODE)

$D_1 \sim D_n$ : DATA (5 BIT = 4 BIT + PARITY BIT)
VERTICAL PARITY CHECK (ODD NUMBER PARITY)

SP : 11111 (STOP CODE)

BCC : HORIZONTAL PARITY CODE
(EVEN NUMBER PARITY CHECK)

EXAMPLE

|     | $b^0$ | $b^1$ | $b^2$ | $b^3$ | P |
|-----|---|---|---|---|---|
| ST  | 1 | 1 | 0 | 1 | 0 |
| $D_1$ | 0 | 1 | 0 | 0 | 0 |
| $D_2$ | 1 | 1 | 0 | 0 | 1 |
| SP  | 1 | 1 | 1 | 1 | 1 |
| BCC | 0 | 1 | 1 | 1 | 0 |

P : VERTICAL PARITY CHECK BIT

SYSTEM FOR COMPENSATING A PHASE DIFFERENCE BETWEEN MAGNETIC TRACKS IN A MAGNETIC RECORDED INFORMATION REGENERATING APPARATUS

DETAILED EXPLANATION OF THE INVENTION

The present invention relates to a system which compensates for a phase difference between magnetic tracks in a magnetic recorded information regenerating apparatus.

In recent years, the bank business has become highly automatized and various new account systems are being utilized. One such system provides, in place of a key operated by hand, a magnetic strip in an exchange member such as a deposit passbook. On said magnetic strip are recorded data such as the number of the account, the balance, etc. The balance is rewritten every time the deposit or the withdrawal is carried out. For the purpose of increasing recording density, the bank business utilizes a two track magnetic recording and regenerating system. Said system is provided with two tracks, that is, a first track and a second track which are adjacent to each other. Peak signals which appear on the first track represent the digit "1" and peak signals which appear on the second track represent the digit "0".

When a deposit or a withdrawal is carried out, the above-mentioned passbook is inserted into an introduction opening of a register apparatus and is sent by rollers, via a guide, to a printer position. As the passbook is sent via the guide, the information in the magnetic strip of passbook is read by a magnetic head adjacent to the guide. At the printer position the amount of the deposit or withdrawal and the amount of the balance in the amount is printed on the passbook. Then the passbook is ejected out of the register apparatus, information being rewritten on said magnetic strip of the passbook by the magnetic heads adjacent to the guide. In the register apparatus, the dimensions of the introduction opening and the guide are, to some degree, larger than that of the passbook. Therefore, the passbook may be inserted even if it is inclined to the right or left, and may also be inclined to the right or left while it is being conveyed to the printer position. Further, the magnetic heads of the register apparatus are often arranged with a phase difference. For the above-mentioned reasons, a phase difference is produced between outputs of the regenerated output recorded on the two tracks. That is, one output is advanced or retarded with respect to the other output so that the output is read with a mistake.

An object of the present invention is to provide a system which obviates the above-mentioned drawback and which can obtain correct information in spite of the phase difference between the tracks.

For achieving the above-mentioned object, the characteristic feature of the present invention is a multi-track information regenerating system which regenerates signals recorded on a plurality of tracks, and which synthesizes the regenerated signals so as to obtain a read output signal. Said system provides a delay circuit which delays the regenerated signals in each track. Three signals are synthesized; that is, a first signal is synthesized from two regenerated signals from two tracks, and a second and a third signal are synthesized from one of the regenerated signals from the two tracks and one of the outputs of the delay circuits. The first, second and third synthesized signals are checked by an error check circuit and the outputs which are determined to be correct are sent to an output terminal.

Further features and advantages of the present invention will be apparent from the ensuing description with reference to the accompanying drawings to which, however, the scope of the invention is in no way limited.

Figure 1A:
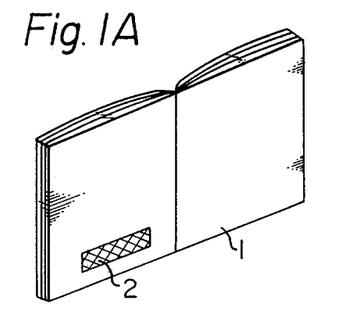
FIG. 1A depicts a passbook which is used in the system of the present invention.
Figure 1B:
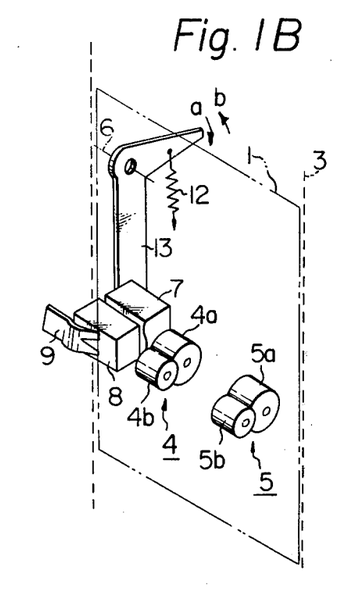
FIG. 1B is a general view of the feeding mechanism of the register apparatus, of the present invention, for the passbook shown in FIG. 1A.
Figure 1C:
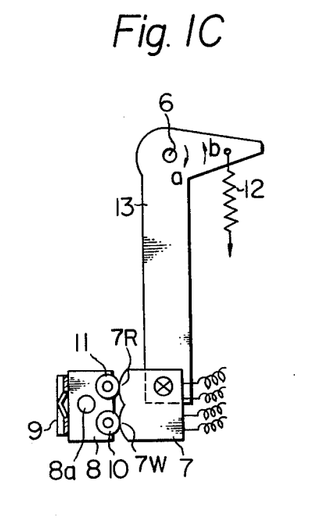
FIG. 1C is a side view of the feeding mechanism of the register apparatus shown in FIG. 1B.

As shown in FIG. 1A, a passbook 1 used in the system according to the invention is provided with a magnetic strip 2. When a deposit or withdrawal is carried out, the passbook 1 is inserted into an introduction opening of the register apparatus of the present invention as shown in FIGS. 1B and 1C. The passbook is fed by feed rollers 4a, 4b and 5a, 5b so that the magnetic strip 2 is positioned between a magnetic head 7 and a supporting block 8. The magnetic head 7 is supported by a supporting member 13 which is pivoted towards the supporting block 8 (as indicated by the small arrow $a$ in FIG. 1C) about an axis 6 by the force of a spring 12. The supporting block 8 is pivoted towards the magnetic head 7 about an axis 8$a$ by the force of spring 9. FIG. 1C is a side view of FIG. 1B, showing that the magnetic head 7 has a write head 7W and a read head 7R. The magnetic strip 2 on the passbook 1 is sandwiched between said heads 7W, 7R and the pressure rollers 10, 11 shown in FIG. 1C.

Figure 2:
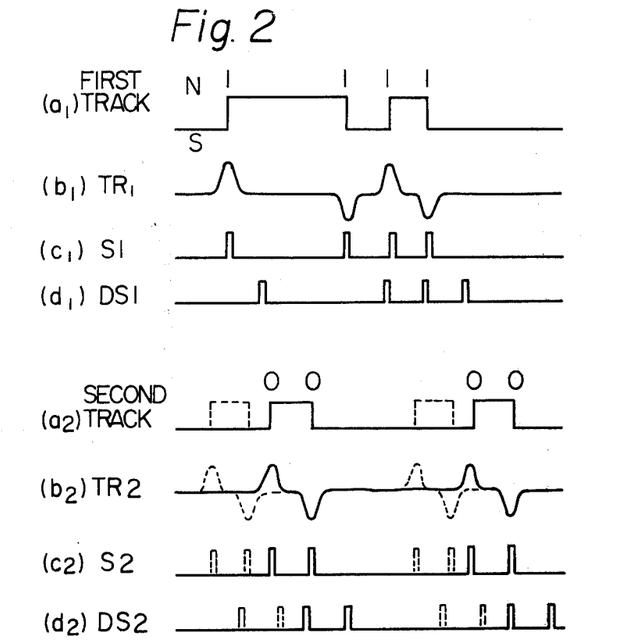
FIG. 2 shows signal waveforms used in the present invention.

Referring to FIG. 2, FIGS. 2 ($a_1$), ($b_1$), ($c_1$) and ($d_1$) are waveforms which are related to the first track, and FIG. 2 ($a_2$), ($b_2$), ($c_2$) and ($d_2$) are waveforms which are related to the second track. In FIG. 2, FIGS. 2 ($a_1$) and 2 ($a_2$) are waveforms which are written on the first track and the second track, respectively. In FIGS. 2 ($b_1$) and 2 ($b_2$) the peak signals appearing on the first track (hereinafter referred to as TR$_1$) represent the value "1" and the peak signals appearing on the second track (hereinafter referred to as TR$_2$) represent the value "0 ." When these peak signals in FIGS. 2 ($b_1$) and 2 ($b_2$) are shaped, the signals S$_1$ and S$_2$ shown in FIG. 2 ($c_1$) and FIG. 2 ($c_2$) can be obtained. The waveforms S$_1$ and S$_2$ shown in FIGS. 2 ($c_1$) and 2 ($c_2$) indicate that the signal "10011100" is recorded by TR$_1$ and TR$_2$. However, the phase difference is producible between the regenerated outputs of the signals recorded on the magnetic strip, as shown by dotted lines in FIGS. 2 ($a_2$) and 2 ($b_2$). If the signals shown in FIGS. 2 ($a_1$), and those shown by dotted lines in FIG. 2 ($a_2$), are read from the $TR_1$ and $TR_2$, the output which is read from $TR_1$ and $TR_2$ is "01011010," which is not a correct output.

Therefore, in the present invention, delay circuits which delay the waveforms S1 and S2, of FIG. 2 to produce DS1 and DS2, respectively, as shown in FIGS. 2 ($d_1$) and ($d_2$), are provided, and the signals S1 and S2 are synthesized. Further, the regenerated signal S1 and the delayed regenerated signal DS2, and the regenerated signal S2 and the delayed regenerated signal DS1 are respectively synthesized. The synthesized signals, that is, S1 DS1 S1, DS2; S2, DS1 are checked by the error detecting circuit to determine whether said composed signals are correct or not, and the signals which are judged correct are selected.

Figure 3:
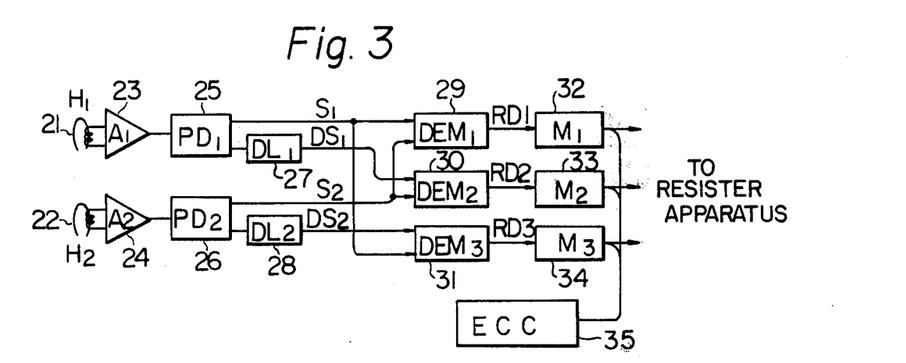
FIG. 3 is a block diagram of the system according to the present invention.

FIG. 3 shows a block diagram of the system according to the present invention. Referring to FIG. 3, two magnetic heads 21, 22 regenerate signals which are recorded on tracks $TR_1$ and $TR_2$, respectively. The outputs of the magnetic heads 21 and 22 are connected via amplifiers 23 and 24, respectively, to peak detectors 25 and 26, respectively. A first output terminal of the peak detector 25 is connected to a first input terminal of a demodulator 29 and a first output terminal of the peak detector 26 is connected to a second input terminal of the demodulator 29. A second output terminal of the peak detector 25 is connected via a delay circuit 27 to a first input terminal of a demodulator 30 and the first output terminal of the peak detector 26 is connected to the second input terminal of the demodulator 30. A second output terminal of the peak detector 26 is connected via a delay circuit 28 to a first input terminal of a demodulator 31 and the first output terminal of the peak detector 25 is connected to a second input terminal of the demodulator 31. The outputs of the demodulators 29, 30 and 31 are connected to input terminals of memories 32, 33 and 34, respectively. The outputs of the memories 32, 33 and 34 are all connected to an error check circuit 35, and also to the register apparatus.

The delay time of the delay circuits 27 and 28 are determined so as to provide a delay time corresponding to a maximum delay which is anticipated between two regenerated signals on the two tracks. For example, when, as shown by dotted lines in FIGS. 2 ($a_2$), ($b_2$), ($c_2$) and ($d_2$) the signal in the second track $TR_2$ advances 150% of one bit length, the advanced signal is delayed 80% of one bit length so as to carry out correct reading. In a non-return-to-zero recording system, a margin corresponding to 100%, that a one bit margin is insured. The demodulator 29 receives an output signal $S_1$ from the peak detector 25 and an output signal $S_2$ from the peak detector 26. The demodulator 30 receives a delayed output signal $DS_1$ of the peak detector 25 and the output signal $S_2$ from the peak detector 26. The demodulator 31 receives the output signal $S_1$ from the peak detector 25 and a delayed output signal $DS_2$ from the peak detector 26. The outputs of the demodulators 29, 30, 31 are stored in memories 32, 33 and 34. The error check circuit ECC checks whether or not the contents of these memories provide the coded form ST-DATA ($D_1$–$D_n$)-SP-BCC which is determined by a predetermined format as subsequently explained relative to FIG. 6B. The circuit ECC also checks the codes ST and ESP, and horizontal parity PBCC and vertical parity, so as to judge whether the regenerated signals are correct or not.

Figure 4A:
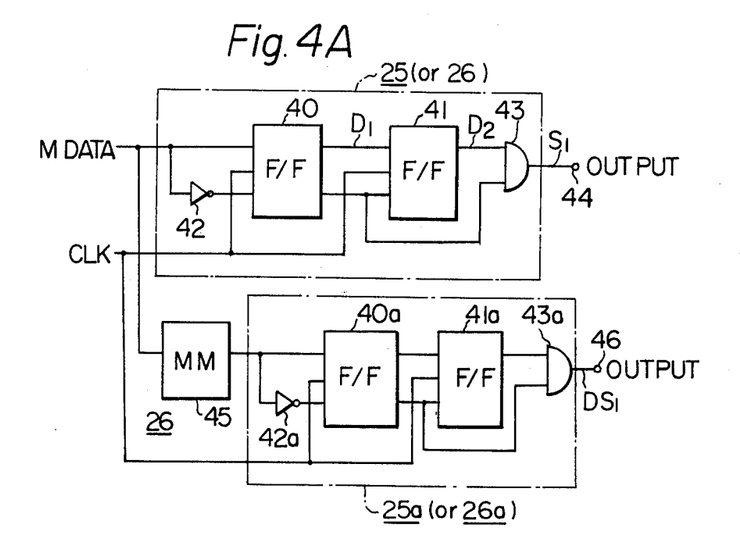
FIG. 4A is one embodiment of the peak detector circuit and a delay circuit shown in FIG. 3.

The circuit shown in FIG. 3 is operated as described below. The magnetic heads 21 and 22 regenerate the information which is recorded in tracks $TR_1$ and $TR_2$ and send the outputs as shown in FIGS. 2 ($b_1$) and 2 ($b_2$) via the amplifiers 23 and 24 to the peak detectors 25 and 26, respectively. The peak detectors 25 and 26 generate the pulses as shown in S1 and S2 of FIG. 2. The pulses S1 and S2 are generated at the peak points of the pulses TR1 and TR2 in FIGS. 2 ($b_1$) and 2 ($b_2$). The delay circuits 27 and 28 delay the signal pulses $S_1$ and $S_2$ as shown in FIGS. 2 ($c_1$) and 2 ($c_2$) and said circuits 27 and 28 generate delayed pulses $DS_1$ and $DS_2$ as shown in FIGS. 2 ($d_1$) and 2 ($d_2$). Detailed circuits of the peak detector 25 and the delay circuit 27 are shown in FIG. 4A. The circuits and function of the peak detector 26 and the delay circuit 28 are similar to the circuits 25 and 27, and therefore, only one explanation of each type circuit will be provided.

Figure 4B:
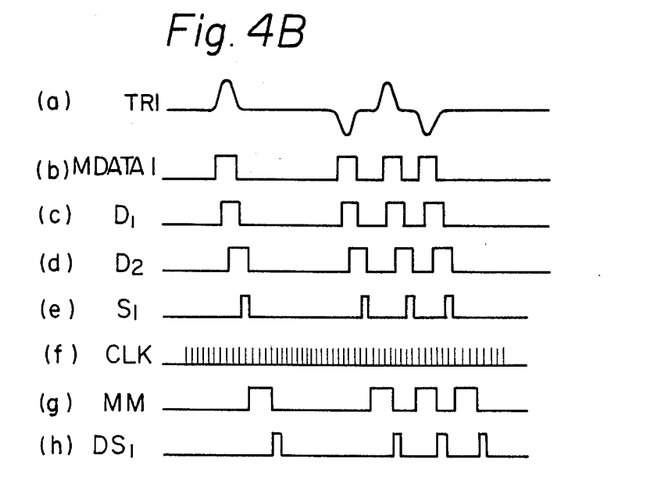
FIG. 4B shows the waveforms of the signals which appear in the main parts of the circuits shown in FIG. 4A.

As shown in FIG. 4A, the peak detector is composed of two flip-flops 40 and 41 which are driven by the same clock pulses CLK as shown in (f) of FIG. 4B. Input pulses MDATA as shown in (b) of FIG. 4B, which form the shaped waveform of the peak waveform TR1 shown in (a) of FIG. 4B, are supplied to the first flip-flop 40. An output $D_1$ of the flip-flop 40, as shown in (c) of FIG. 4B, is supplied to the second flip-flop 41. An inverted input pulse is supplied via an inverter 42 to another input terminal of the first flip-flop 40. An output $D_2$ of the second flip-flop, as shown in (d) of FIG. 4B, and a second output of the first flip-flop 40 are sent via an AND circuit 43 to an output terminal where the signal $S_1$, as shown in (e) of FIG. 4B, is obtained. Referring to FIG. 4A, the delay circuit 26 is constituted by a monostable multivibrator 45. In the example shown in FIG. 4A, another peak detector 25a is connected after the monostable multivibrator 45. The function of the peak detector 25a is the same as that of the peak detector 25. The relation between the output of the monostable multivibrator 45 and a delayed output 46 is shown in (g) and (h) of FIG. 4B.

Figure 5A:
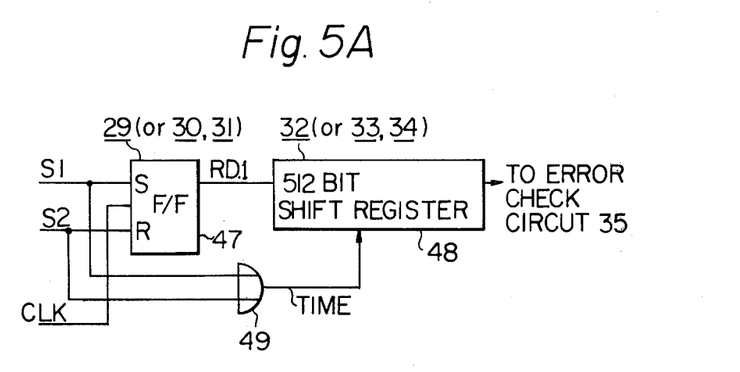
FIG. 5A is one embodiment of the demodulator and the memory shown in FIG. 3.
Figure 5B:
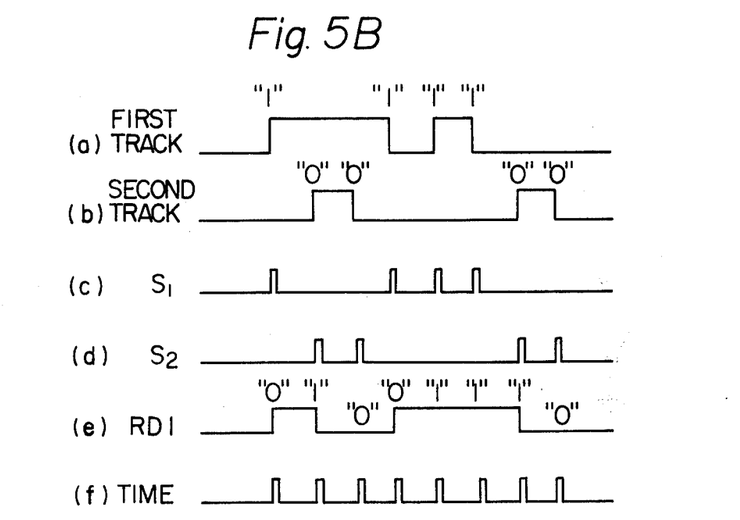
FIG. 5B shows the waveforms of the signals which appear in the main parts of the circuit shown in FIG. 5A.

Demodulators 29, 30 and 31 shown in FIG. 3 receive the signals $S_1$ and $S_2$, $DS_1$ and $S_2$, $S_1$ and $DS_2$, respectively. Based on these signals, a demodulated output "10011100" is obtained from these demodulators and said demodulated output is stored in the memories 32, 33 and 34. With respect to the demodulator and the memory, we will explain, as an example, the demodulator 29 and the memory 32 with reference to FIG. 5A and 5B. Referring to FIG. 5A, the demodulator 29 is composed of one flip-flop 47 which is driven by clock signal CLK. The signal $S_1$ shown in (c) of FIG. 5B, which is based on the first track information as shown in (a) of FIG. 5B, is supplied to a set input terminal S of the flip-flop 47 and the signal $S_2$, shown in (d) of FIG. 5B which is based on the first track information as shown in (b) of FIG. 5B, is supplied to a reset input terminal R of the flip-flop 47. A signal RD1 having a waveform as shown in (e) of FIG. 5B is obtained at the output of the flip-flop. The output RD1 shown in (e) of FIG. 5B is stored in a memory, for example, 512 bit shift register 48. The signals $S_1$ and $S_2$ are also supplied, via an OR circuit 49, as a timing signal TIME as shown in (f) of FIG. 5B, to the 512 bit register 48, and the peak signal waveforms which are shown in (a) and (b)

of FIG. 5B are stored in the memory in a form RD1 as shown in (e) of FIG. 5B.

Figure 6A:
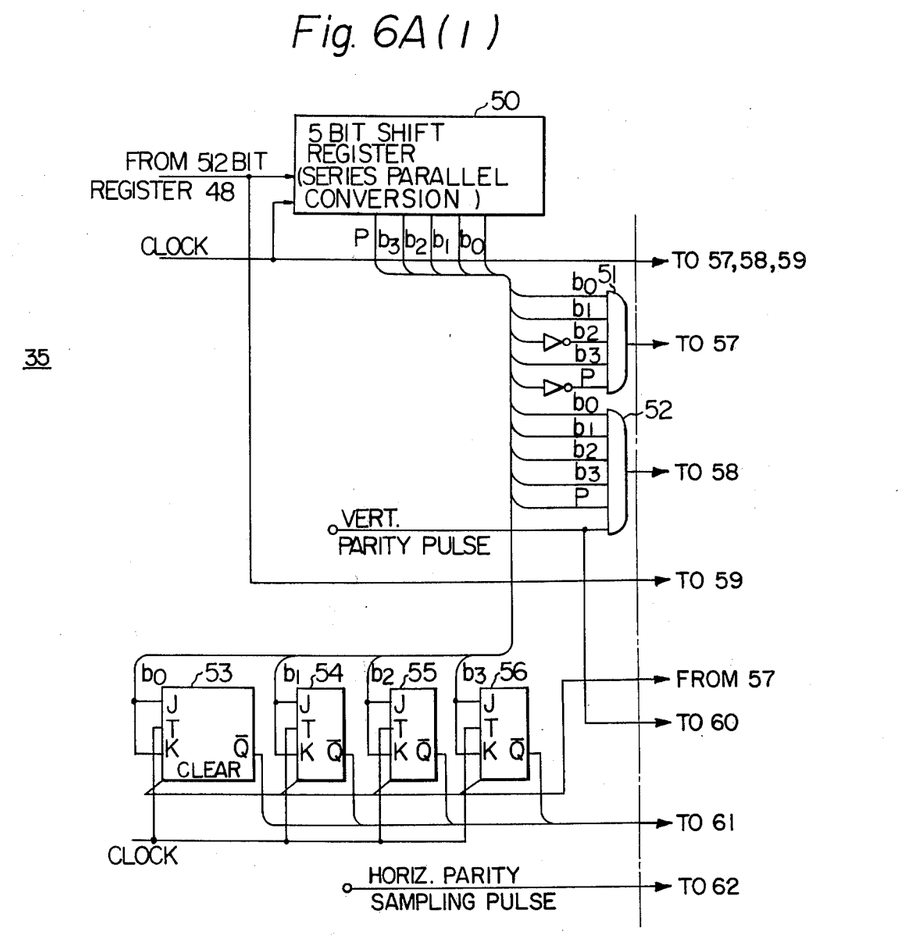
FIG. 6A, consisting of 6A (1) and 6A (2), is one embodiment of the error check circuit shown in FIG. 3.
Figure 6B:
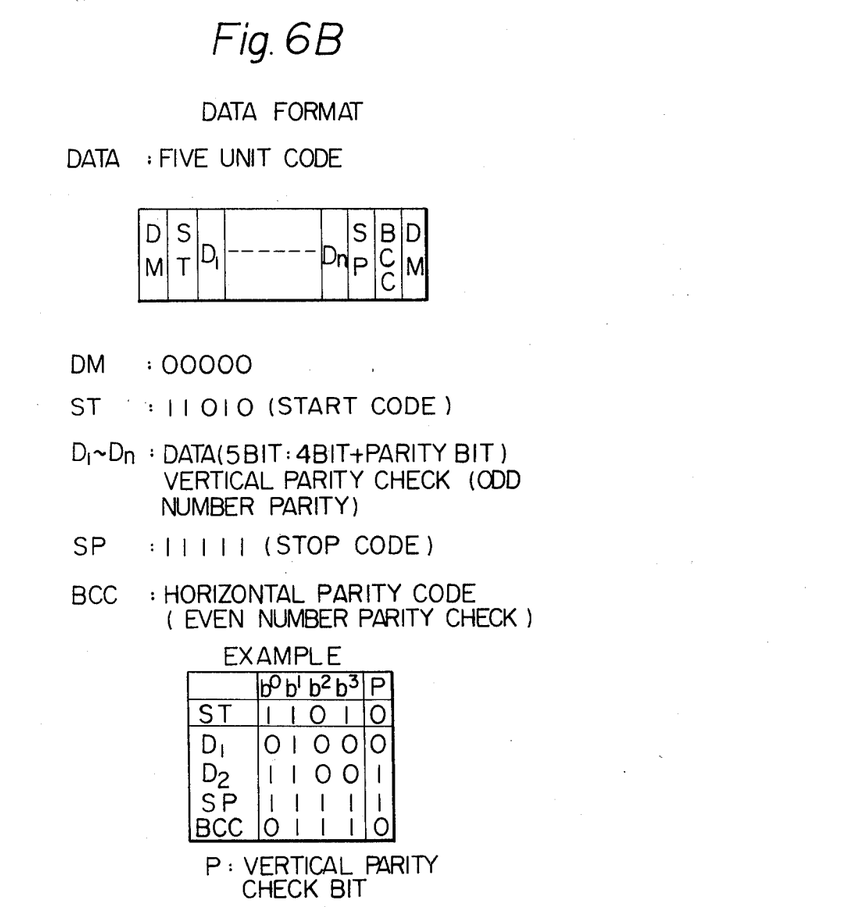
FIG. 6B shows the data format which is used in the apparatus according to the present invention.

The output of the 512 bit shift register 48 is supplied to an error check circuit 35, which is shown in detail in FIG. 6A, and the data format and one example of the data which are used in the circuit 35 of FIG. 6A are shown in FIG. 6B.

Referring to FIG. 6B, a data which is used in the circuit 35 is a five unit code. That is, said data is composed of a dummy code DM, a start code ST, data $D_1$–$D_n$, a stop code SP and a block check code BCC. As shown in FIG. 6B, a dummy code DM is composed of five zero bits, a start code ST is "11010," the data $D_1$–$D_n$ are composed of five bits, one bit of which is used for a parity bit. The stop code SP is composed of five one bits. The block check code BCC is used for a horizontal parity code. For example, in the first bit $b_0$, the value of the first bit $b_0$ of the BBC code is determined so that the total number of "1" bits in the data $D_1$, $D_2$, SP and BBC shown in the example is an even number.

Referring to FIG. 6A the output of the 512 bit shift register 48 is supplied to a five bit shift register 50 so as to convert series input data to parallel form. The parallel output data of the five bit shift register 50 is supplied to AND gates 51, 52 and flip-flop circuits 53, 54, 55 and 56. The output of the AND gate 51 is supplied to a flip-flop 57 so as to detect the start code STX. And the output of the flip-flop 57 resets flip-flops 53, 54, 55, 56, 58 and 59. The output of the AND gate 52 is supplied to a flip-flop 58 so as to detect the stop code. A flip-flop 59 receives the output of the 512 bit shift register. The output of the flip-flop 59 and a vertical and horizontal parity pulse are supplied to an AND gate 60 so as to check the vertical parity error. The outputs of the flip-flops 53, 54, 55 and 56 which are composed of four bits are supplied to a NAND gate 61. The output of the NAND gate 61 and a horizontal parity sampling pulse are supplied to an AND gate 62 so as to detect the horizontal parity error. As described above, the error check circuit 35 detects the output of the memory circuit.

When each delay circuit 27 and 28 provides 80% delay and the regenerated signals have no advance or delay, the contents which are stored in memories 32, 33 and 34 are all correct. When each delay circuit 27 and 28 provides 80% delay and the regenerated output of the track $TR_2$ advances 150% of the period between the pulses, as shown by dotted lines in FIGS. 2 ($a_2$), 2($b_2$), 2($c_2$) and 2($d_2$), the content of the memory $M_1$ becomes "01011010," the content of the memory $M_2$ becomes "00110101" and the content of the memory $M_3$ becomes "10011100." Therefore, the content of the memory $M_3$ is correct and the contents of the other memories are not correct. When the delay of the regenerated output of the track $TR_2$ is smaller than 180% of the period, the content of at least one of the memories is correct and the correct output can be obtained.

As mentioned above, according to the present invention, the correct reading of the information stored in the tracks $TR_1$ and $TR_2$ can be carried out, if skew phenomenon exists between the magnetic head and the recording medium. Further, density of the recording information can be increased and, therefore, a large amount of data can be stored in a magnetic strip having a small dimension.

It should be understood that the present invention is applicable not only to an apparatus having two tracks but, also, to an apparatus having more than three tracks. Further, it should be understood that the present invention is applicable to not only a magnetic recording apparatus but, also, to an optical recording apparatus.

What is claimed is:

1. System for compensating a phase difference between tracks of a recording medium used in a magnetic recorded information regenerating apparatus which regenerates signals recorded on a plurality of said magnetic tracks and which composes and demodulates said signals so as to obtain a read output signal comprising:
    a plurality of delay means for delaying signals which are recorded on each track of said recording medium;
    a first means for composing said signals;
    a plurality of second means for composing said delayed signal of one track and said signals of each track except said one track;
    detecting means for detecting whether the outputs of said first and second means are correct or not, and;
    means for selecting the correct output from said outputs of said first and second means so as to use said correct output.

2. System which is claimed in claim 1, wherein said signals are recorded on a first and a second tracks, a first and a second signal which are recorded on said first and said second tracks are delayed by said delay means, said first and second signals are composed by said first means, said first signal and a second delayed signal which is obtained by said delay means are composed by said second means, said second signal and a first delayed signal which is obtained by said delay means are composed by said second means.

3. System which is claimed in claim 1, wherein said recording medium is a magnetic strip in a passbook.

4. System which is claimed in claim 2, wherein said tracks are magnetic tracks which are provided on a magnetic strip of said passbook.

5. Apparatus for compensating a phase difference between magnetic tracks in a magnetic recorded information regenerating apparatus comprising:
    a first track wherein a peak signal represents signal "1";
    a second track wherein a peak signal represents signal "0";
    a first peak detector which detects said peak signal of said first track;
    a first delay circuit which delays the output of said first peak detector;
    a second peak detector which detects said peak signal of said second track;
    a second delay circuit which delays the output of said second peak detector;
    a first demodulator which receives and demodulates the outputs of said first and second peak detectors;
    a second demodulator which receives and demodulates the outputs of said first delay circuit and said second peak detector;
    a third demodulator which receives and demodulates the output of said second delay circuit and said first peak detector;
    a first, a second and a third memory which store the outputs of said first, second and third demodulators, respectively, and;
    an error check circuit which detects whether the content of said first, second and third memories are correct or not, and which sends out the correct content of said first, second said third memories as an output.

6. A system for compensating a phase difference between signals recorded on respective tracks of a recording medium used in a magnetic recorded information regenerating apparatus which regenerates signals recorded on a plurality of said magnetic tracks and which composes and demodulates said signals so as to obtain a read output signal comprising:
   regenerating means, one for each of said respective tracks, for regenerating said signals recorded on said respective tracks;
   a plurality of delay means, one for each of said respective tracks, for delaying said signals which are recorded on each respective track of said recording medium to produce respective delayed signals;
   a first means connected to said regenerating means and having a first output for composing said signals recorded on said respective tracks;
   a plurality of second means each connected to said delay means of one of said tracks and to said regenerating means of the other tracks, and having a second output, for composing said delayed signal of said one of said tracks and said signals recorded on said other tracks; and
   detecting means connected to said first composing means and to said plurality of second composing means for detecting whether the first and second outputs of said first second outputs so as to use said correct output.

7. A system as recited in claim 6, wherein said plurality of tracks includes a first and a second track, a first and a second signal are recorded on said first and said second tracks, said delay means including first and second delay circuits for respectively delaying said first and second signal to produce, respectively, a first and second delayed signal, wherein said first and second signals are composed by said first means, said first signal and said second delayed signal which is obtained by said delay means are composed by said second means, said second signal and said first delayed signal which is obtained by said delay means are composed by said second means.

8. A system as recited in claim 6, wherein said recording medium is a magnetic strip in a passbook.

9. A system as recited in claim 7, wherein said tracks are magnetic tracks which are provided on a magnetic strip of said passbook.

10. In a system for reading respective signals from a plurality of respective magnetic tracks, which respective signals are propense to experience a phase difference therebetween; said system comprising, in combination:
   regenerating means, one for each respective track, for regenerating said respective signals by reading said respective signals from said respective tracks;
   detecting means, one for each respective track, connected to a respective one of said regeneraing means, for detecting amplitude peaks in said respective signals and for providing an output signal indicating said amplitude peaks; and
   synthesizing means connected to each of said detecting means for synthesizing said amplitude peak indicating output signals so as to provide an output which, in the absence of said phase difference, is a correct output, and which, in the presence of said phase difference, is an erroneous output;
   an arrangement for compensating for said phase difference, said arrangement comprising, in combination:
   delay means, one for each respective track, operatively associated with a respective one of said detecting means for delaying said amplitude peak indicating output signal so as to provide a respective delayed output signal;
   additional synthesizing means, one for each delay means, connected to a respective one of said delay means and to a respective one of said detecting means with which said respective delay means is not associated, for synthesizing said delayed output signal provided by said respective delay means and said amplitude peak indicating output signal of said respective one of said detecting means so as to provide an output which may be said correct output; and
   selecting means connected to said synthesizing means and to said additional synthesizing means for selecting said output thereof which is said correct output.

11. In the system of claim 10 wherein said selecting means includes:
   a serial-to-parallel shift register connected to said synthesizing means for receiving said output thereof, and providing a parallel output;
   a vertical parity checking circuit connected to said shift register so as to receive said parallel output for providing a vertical parity error signal when there is a vertical parity error in said output of said synthesizing means; and
   a horizontal parity circuit connected to said shift register so as to receive a sequence of parallel outputs, each having a plurality of corresponding bit positions, for providing a horizontal parity error signal when there is a horizontal parity error in any of said corresponding bit positions of said sequence of parallel outputs.

12. In the system of claim 11 wherein said vertical parity checking circuit includes a flip-flop circuit connected to said synthesizing means and said additional synthesizing means for receiving said outputs thereof in a given sequence, and providing an output indicating alternately odd and even parity, and a gate connected to said parity indicating output and responsive to a periodic vertical parity pulse for indicating any vertical parity error in said outputs of said synthesizing and additional synthesizing means respectively.

13. In the system of claim 11 wherein said horizontal parity checking circuit includes a plurality of flip-flop circuits, one for each of said corresponding bit positions, for respectively receiving said corresponding bits of said sequences of parallel outputs, and for respectively providing outputs indicating alternately odd and even parity, and a gate circuit connected to each of said outputs of said flip-flop circuits and responsive to a periodic horizontal parity pulse for indicating a horizontal parity error in said corresponding bit positions of said sequences of parallel outputs.

14. In the system of claim 11 including a start detect circuit connected to said shaft register so as to receive said parallel output for detecting a predetermined start code in said parallel output whereby to issue a start signal.

15. In the system of claim 11 including a stop detect circuit connected to said shift register so as to receive said parallel output for detecting a predetermined stop code in said parallel output whereby to issue a stop signal.

16. In the system of claim 10 wherein said magnetic tracks are on a magnetic strip mounted on a passbook.

* * * * *

UNITED STATES PATENT AND TRADEMARK OFFICE
CERTIFICATE OF CORRECTION

PATENT NO. : 4,023,203
DATED : May 10, 1977
INVENTOR(S) : MASARU BABA et al

It is certified that error appears in the above–identified patent and that said Letters Patent are hereby corrected as shown below:

Column 2, line 64, "$S_1$ and $S_2$" should be --S1 and S2--;
line 65, "$S_1$" should be --S1--;
line 66, "$S_2$" should be --S2--.

Signed and Sealed this ninth Day of August 1977

[SEAL]

Attest:

RUTH C. MASON
*Attesting Officer*

C. MARSHALL DANN
*Commissioner of Patents and Trademark*